United States Patent [19]

Beck

[11] 4,072,455
[45] Feb. 7, 1978

[54] SPIRAL-LINE PRESS FOR THERMOPLASTIC SYNTHETICS

[76] Inventor: Erich Beck, Ingenieur, 652 Worms 27, Am See 29, Germany

[21] Appl. No.: 624,424

[22] Filed: Oct. 21, 1975

[30] Foreign Application Priority Data

Oct. 22, 1974 Germany ............................. 2450030

[51] Int. Cl.² ............................................... B29F 3/06
[52] U.S. Cl. ................................ 425/133.1; 100/146; 425/208; 425/380; 425/467
[58] Field of Search ............................. 259/191, 192; 425/133.1, 133.5, 205, 207, 208, 380, 467, 113, 376, 461, 131.1; 198/669; 100/146; 264/171, 176 R

[56] References Cited

U.S. PATENT DOCUMENTS

| 3,191,228 | 6/1965 | Schluter | 425/376 X |
| 3,295,160 | 1/1967 | Schippers | 425/208 X |
| 3,507,951 | 4/1970 | Morecroft et al. | 425/208 X |
| 3,577,588 | 5/1971 | Chisholm | 425/113 X |

FOREIGN PATENT DOCUMENTS

| 343,118 | 6/1960 | Switzerland | 425/131.1 |

Primary Examiner—Francis S. Husar
Assistant Examiner—Mark Rosenbaum
Attorney, Agent, or Firm—Staas & Halsey

[57] ABSTRACT

A spiral-line press with a double contra-screw arrangement fixed on a single shaft. Each of the screws on the spiral-line press have a length/diameter ratio of less than or equal to 14/1 and a combined L/D - ratio of less than or equal to 28/1. In addition, the phase depth of the metering zones are less than or equal to 1/25th of the spiral diameter and the peripheral speed of the spiral-line press is greater than or equal to 0.3 m/sec. The output from the metering zones of the spiral-line press are extruded by an outlet fitting which transforms the flows of the extruded matter so that one output is extruded concentrically around the other.

2 Claims, 2 Drawing Figures

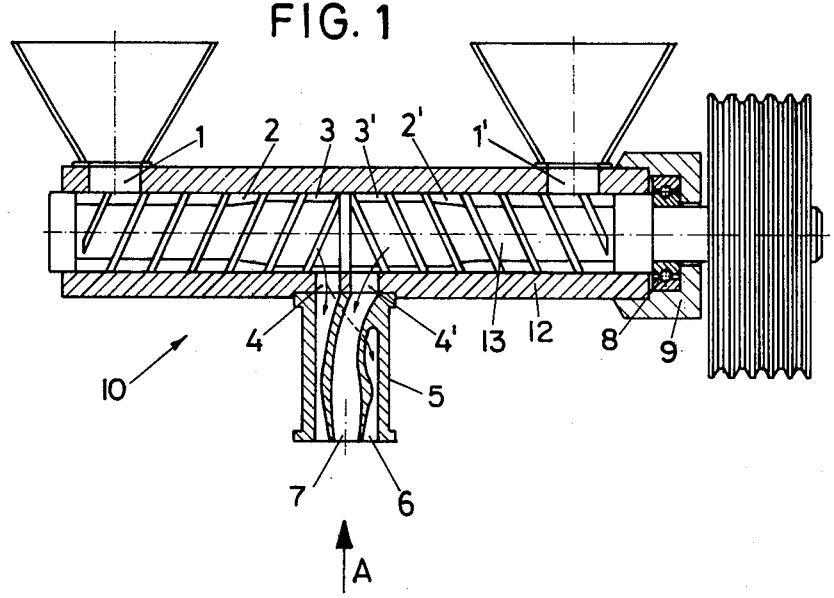
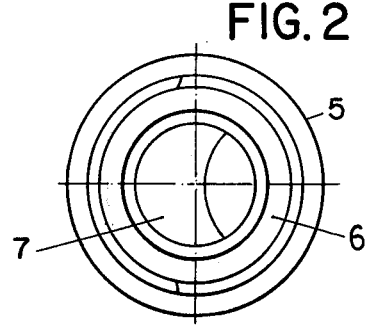

SPIRAL-LINE PRESS FOR THERMOPLASTIC SYNTHETICS

BACKGROUND AND SUMMARY OF THE INVENTION

The invention pertains to a spiral-line press for the extruding of thermo-plastic synthetics in a reciprocally conveying co-axial construction with two feeding sources. It pertains to a construction of the spiral geometry in such a way that the space requirement can be reduced and the operation be less expensive.

Spiral-line presses have become known which were cut on one shaft and which had reciprocally conveying canals of cochlea in which the compensation of the longitudinal forces was the main factor, especially in double and multiple spirals, in which the housing for the axial bearing is complex.

These constructions have, until today, not reached any special importance, since the advantages of an axial bearing simplification are generally offset by an increased expenditure for the operation.

In the conventional spiral-line presses of today the usual ratios of spiral length to spiral diameter are between 20/1 and 30/1. This means, in a reciprocal conveying arrangement of two spirals on one shaft a combined length of 40/1 to 60/1. For spirals of such lengths, a one-sided operation is no more feasible, since the force for the operational shaft would surpass the permissible dexterity values in performances as are nowadays required. One must, therefore, operate from two sides, and thereby the advantage of a cheaper axial bearing is offset.

To fully utilize the advantages of the axial power compensation, the reciprocally conveying spirals are, based on the presented proposal, constructed at a total length of a maximum of 28/1 and with a canal of cochlea depth in the metering zones of 1/25 of the spiral diameter.

Thereby, the polar resistance moment of the input shaft is, at one side of the shaft, sufficient to operate the spirals. Preferably one should apply the spiral geometry of fast-running, adiabatically working spiral-line presses (See "Optimal Measurings of Fast-running Extruder Spirals, Synthetics Journal Year 1963, Edition 10.) (German Title: Optimale Abmessungen von schnelllaufenden Extruderschnecken", Zeitschrift Kunststoffe, Jahrgang 1963, Heft 10).)

Fast-running autogenous or adiabatic spiral presses can only be used successfully, if the ratio of longitude to diameter $L/D \leq 14/1$ is not exceeded, thereby, in an arrangement of two spirals on one shaft, the condition $L/D \leq 28/1$ results. An autogenous or adiabatic operational manner is, in short spirals of $L/D \leq 14/1$, only possible with flat gears in the metering zone and peripheral velocities of more than 0.3 m/sec. The savings in the longitudinal bearing can only be utilized to its fullest extent, if the two spiral presses which are on one shaft do not exceed a total length of $L/D \leq 28/1$, since the required operational capacity for the two spirals can be applied from one side only below this limit.

It is possible, in adherence to the measures proposed in this invention, to operate one spiral press in counterarrangement with one shaft and thereby to utilize the simplification of the savings in the bearing. A combination of the characteristics L/D ratio with the phase depth in the metering zone and the peripheral velocity lead to a progressive effect; this is the essence of the presented invention.

Based on the formula of the presented invention, the two flows of matter which are moving towards each other are guided out of the extruder by a shaped part in vertical axial direction in a manner that the matter flowing from the one side, with a circular cross-section in the center, and the flow of matter on the other side around the circular cross-section, exits in orbicular cross-section. This construction type in the invention as presented serves the circular distribution of the two flows of matter, it can be simultaneously applied if the flows of matter consist of different materials.

A circular distribution is required because the two flows of matter, even if the same materials are processed, can show small viscosity differences as the result of processing tolerances of spirals and boxes.

Another possibility to equalize differences in the two product flows consist in the after-switching of a known static mixing device.

BRIEF DESCRIPTION OF THE DRAWINGS

FIG. 1 is a cross-sectional view of the present invention.

FIG. 2 is an end view of output fitting shown in FIG. 1.

DETAILED DESCRIPTION OF THE PREFERRED EMBODIMENT

FIG. 1 shows the proposed spiral-line press 10 in longitudinal cross-section. Support housing 11 comprises two housings 9 and 12 with axial bearing 8 located in housing 9 and shaft 13 with spirals located in housing 12. Granulate or powder material enters through input openings 1 and 1' at respective ends of the press 10, into the input zones of the spirals. The material is compressed and transported, over the level-cut metering zones 3 and 3', to outlets 4 and 4'. A fitting 5 guides the two flows of matter from the outlets 4 and 4' in such a way, that the two semicircular outlet cross-sections 4 and 4' are transformed on a circular cross-section. The output of outlet 4' exits at the center 7 of the fitting 5 with a circular cross-section and the output of outlet 4 exits in circular motion at opening 6 with a ring-line cross-section around the round cross-section 7, which is in the center.

The outlet cross-section from the two spiral boxes can have any desired shape. The guiding line of the two exit channels, however, must be designed in such a way that both flows of matter exit concentrically, i.e. must, in concentrical arrangement, be guided into a following form device.

I claim:
1. A spiral-line press comprising:
   a support housing, a circularly driven shaft in said housing an axial bearing in said housing supporting said shaft, means provided so that said housing for the axial bearing is simplified and the space requirements can be reduced including;
   said shaft defining first and second material conveying portions;
   a first spiral conveyor on said shaft at said first material conveying portion;
   a second spiral conveyor on said shaft at said second material conveying portion;
   said first and second spirals are opposingly oriented on said shaft for conveying material from opposite ends of said shaft along respectively corresponding portions;

said first and second spiral conveyors having respective length to diameter ratios of not more than 14:1;
said first and second spiral conveyors defining corresponding metering zones where conveyed material is output from said press, wherein said metering zones have a phase depth of not more than 1/25 of said corresponding spiral diameter; and
means connected to said shaft for driving said spirals along with said shaft at a peripheral speed of at least 0.3 m/sec.

2. A spiral-line press as in claim 1, wherein also comprising means for guiding the two flows of material out of the housing in a manner flowing from one side in the center and flowing from the other side around said center flow for concentric distribution of said two flows of material which includes a specially configured outlet fitting mounted on said housing to cause the output material at one metering zone to be extruded circumferentially around the material output at said other metering zone.

* * * * *